United States Patent
Vanderheyden et al.

(10) Patent No.: US 9,275,666 B1
(45) Date of Patent: Mar. 1, 2016

(54) ROTATABLE RECORDING HEAD ACTUATOR FOR CORRECTING ANGULAR ERROR IN TAPE DRIVES

(71) Applicant: ORACLE INTERNATIONAL CORPORATION, Redwood City, CA (US)

(72) Inventors: William J. Vanderheyden, Broomfield, CO (US); Camila Camargo, Boulder, CO (US); Ian Durkin, Washington, DC (US); Gamal Elbialy, Raleigh, NC (US); Kenneth Wine, Bethesda, MD (US); Xuyue Shi, Hedong Dis Tiajin (CN); Brendan Lee, Niwot, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 0 days.

(21) Appl. No.: 14/683,250

(22) Filed: Apr. 10, 2015

(51) Int. Cl.
  *G11B 5/584* (2006.01)
  *G11B 5/56* (2006.01)
  *G11B 5/588* (2006.01)

(52) U.S. Cl.
  CPC . *G11B 5/56* (2013.01); *G11B 5/588* (2013.01)

(58) Field of Classification Search
  None
  See application file for complete search history.

(56) References Cited

U.S. PATENT DOCUMENTS

| | | | | |
|---|---|---|---|---|
| 5,508,865 A * | 4/1996 | La Garcia | ............ | G11B 5/584 360/291 |
| 8,054,576 B2 * | 11/2011 | Bui | ........................ | G11B 5/584 360/76 |

* cited by examiner

*Primary Examiner* — K. Wong
(74) *Attorney, Agent, or Firm* — Marsh Fischmann & Breyfogle LLP; Kent A. Lembke

(57) ABSTRACT

A recording head actuator assembly for correcting for tape mis-registration (TMR) in a tape drive. The assembly includes a recording head actuator including a recording head and actuators for laterally positioning the head relative to tracks of a tape. The assembly also includes a dynamic azimuth control (DAC) assembly that includes a flexural pivot and a rotation driver. The rotation driver applies a driving force on the flexural pivot causing the flexural pivot to rotate about a hinge axis and the head to rotate about a rotation axis passing through the head, from a first azimuth angle to a second azimuth angle. The rotation axis and the hinge axis coincide, and the rotation axis of the head is transverse to a direction of tape travel. In some useful implementations, the flexural pivot may include a planar outer flexure and a planar inner flexure arranged as a cross strip pivot.

19 Claims, 12 Drawing Sheets

ROTATABLE RECORDING HEAD ACTUATOR FOR CORRECTING ANGULAR ERROR IN TAPE DRIVES

BACKGROUND

1. Field of the Invention

The present invention generally relates to tape drives and recording head actuator designs and, more particularly, to a recording head actuator assembly (and a tape drive incorporating such an assembly) adapted to address angular error or misalignment between read and write elements of a recording head and magnetic tape passing over the recording head.

2. Relevant Background

Tape drives have been widely employed in the data storage industry for over thirty years due to their ability to store large amounts of data on a relatively small and inexpensive removable format. Typically, tape drives use a storage tape that is wound between a pair of tape reels as data is transferred to or from the tape media via a read/write tape head assembly (or recording head actuator assembly). In one arrangement, one of the reels (e.g., the "take-up" reel) is part of the tape drive while the other reel (e.g., the "cartridge" or "supply" reel) is part of a removable cartridge. Upon insertion of the cartridge into the tape drive, the storage tape on the cartridge reel is coupled to the take-up reel of the tape drive (e.g., via respective leaders). After coupling, the tape is unwound from the cartridge reel, moved past the recording head assembly and wound onto the take-up reel via a drive motor. Next, the tape is unwound from the take-up reel, moved past the tape head assembly and wound onto the cartridge. Subsequently, the storage tape must be uncoupled from the take-up reel, prior to removing the cartridge from the tape drive. In another arrangement, both reels are part of a cassette which is inserted into a tape drive and driven by a drive motor.

To increase the storage density and reduce the access time of magnetic tapes, a popular trend is towards multi-head, multi-channel fixed head structures with narrowed recording gaps and data track widths so that many linear data tracks may be manipulated on a tape medium of a predetermined width (e.g., such as one-half inch width tape) passing by the head structures at increasingly faster rates of speed. However, various factors work against the ability of present systems to achieve such increased storage densities and reduced access times.

Physically storing data on magnetic tape remains crucial in the data storage industry, but this will only continue as long as the data stored on the tape remains uncorrupted, resists degradation over large spans of time, and can readily be retrieved from the tape. One problem presently plaguing the date storage industry is related to the dimensional stability of the magnetic tape. More specifically, the resolution of the tracks on the tape have become so fine that variations in temperature, humidity, and pressure can change the physical dimensions between the tracks on the tape (also called tape dimensional stability (TDS)), but, at the same time, similar changes do not occur within the recording head such that the spacing of the read and write elements remain unchanged. As a result, there can be track misregistration (TMR), e.g., between servo tracks and servo readers and between read elements and written tracks, due to TDS that can cause errors in later reading data from the tape and writing new data to the tape.

TMR can also result from an angular misalignment between the recording head and the tape (e.g., the tape is at an angle (often labeled as an azimuth angle) relative to the read and write elements instead of running perfectly orthogonal to the head). At this point, it may be useful to further discuss tape motion and its variation to understand the problem of TMR in a typical tape drive. Lateral tape motion (LTM) refers to the vertical motion of the tape in reference to the recording head. This motion can become problematic when the fine tracks of the tape become offset in regards to the writing portion of the recording head. This issue has been accounted for by use of two motors (a coarse motor along with a fine motor) actuating the recording head assembly to trace the lateral tape motion or motion of the servo tracks on the tape. In contrast with regard to angular misalignment, an azimuth in mathematics is simply an angular measurement in spherical coordinates, and azimuth (sometimes referred to as skew) in a tape drive can be caused by the non-linear motion of the tape relative to the recording head. In the tape drive, an error can be caused due to the existence of a non-zero azimuth angle between the recording head (i.e., a line extending through the linearly arranged read and write elements on the head) and a line extending perpendicular to the direction of travel for the tape.

Hence, there remains a need for a recording head assembly that is better designed to address TMR and to reduce the likelihood of errors caused by TDS or by the tape being at an unexpected azimuth angle relative to the recording head. Preferably, the new recording head assembly would be useful in existing tape drive configurations, e.g., the size of the assembly would fit within space presently provided for a recording head assembly, and, further, it would be useful for the assembly to be relatively inexpensive to manufacture while having an acceptably long service life.

SUMMARY

Briefly, a recording head actuator assembly (and tape drives with such an assembly) is described that addresses problems with track misregistration (TMR) such as those caused by angular misalignment between servo and data tracks of the tape and a recording head (or its read and write elements) and also those related to tape dimensional stability (TDS). The recording head actuator assembly is designed to provide a recording head that can be selectively rotated about a rotation axis passing through the recording head so as to correct errors by adjusting the azimuth angle. In some embodiments, the entire recording head actuator is supported such that it can be rotated about the rotation axis.

Rotation of the recording head actuator effectively changes the spacing of the read and write elements relative to the tape travel direction (or tape path in the tape drive). In some embodiments, the recording head actuator is supported by a flexure pivot assembly along with a rotation driver (along with a controller(s) for the driver these can be considered a dynamic azimuth control (DAC) assembly or mechanism), and the flexure pivot assembly may include a cross strip pivot or other flexure pivot mechanism affixed to the recording head actuator and with a hinge axis coinciding with the rotation axis of the recording head actuator assembly. The rotation driver may be implemented with a number of actuators with some useful embodiments utilizing a linear voice coil actuator (also known as a voice coil motor in the industry) for actuating movement of the flexure pivot mechanism (e.g., with its plunger/drive shaft contacting or attached to a surface of the flexure pivot mechanism).

In some implementations, the assembly is adapted to rotate the recording head actuator through a predefined angular rotation range (such as up to 10 degrees with a maximum angular rotation range of −0.5 to 6.5 degrees used in one particular embodiment) or so as to provide a desired angle of rotation. Further, it was determined that it would be desirable for the rotation to be provided relatively quickly at some predefined angular oscillation value such as to oscillate plus or minus 0.25 to 1.0 degrees (with 0.5 degrees used in some cases) at a frequency in the range of 50 to 70 Hertz (with 60 Hertz used in some cases). Use of the recording head actuator assembly in existing and future tape drives is likely to increase reliability and capacity. The use of a flexure pivot mechanism is desirable as it can support the weight of the recording head actuator while also allowing a single degree of freedom for rotation in the azimuth plane (e.g., about the rotation axis). Further, the flexure pivot mechanism is expected to have a long lifespan or service life as these devices are well suited for providing small oscillatory motions.

More particularly, a recording head actuator assembly is provided that is adapted or designed for correcting for tape mis-registration (TMR) in a tape drive. The assembly includes a recording head actuator including a head with a plurality of read or write elements and one or more actuators for laterally positioning the head relative to tracks of a tape passing over the head and its elements. The assembly also includes a dynamic azimuth control (DAC) assembly that includes a flexural pivot and a rotation driver. In operation of the assembly, the rotation driver operates to apply a driving force on the flexural pivot, and, in response to the driving force, the flexural pivot rotates about a hinge axis. Further, in response to the rotation of the flexural pivot, the head rotates, about a rotation axis passing through the head, from a first azimuth angle to a second azimuth angle (e.g., through a range of about 7 degrees such as from an azimuth angle of −0.5 degrees to an azimuth angle of 6.5 degrees (or an angle between these two end points)).

In the assembly, the rotation axis and the hinge axis coincide, and the rotation axis of the head is transverse to a direction of travel (e.g., orthogonal or nearly so) for tape past the head during read or write operations of the tape drive. In some useful implementations, the flexural pivot may be provided by a planar outer flexure and a planar inner flexure arranged as a cross strip pivot (e.g., an outer flexure that is rectangular with a rectangular central opening and an inner flexure that is "I-shape" with a beam/strip passing through the opening in the outer flexure). When the cross strip pivot is used, the hinge axis coincides with an intersection between a first plane passing through the planar outer flexure and a second plane passing through the planar inner flexure.

In some cases, the rotation driver may include a linear voice coil actuator with a plunger contacting a flexure in the flexural pivot to selectively apply the driving force. Then, the assembly may also include a controller operating in response to a detection of tape mis-registration to provide control signals to the linear voice coil actuator to move the plunger (e.g., an extension shaft attached to the plunger may contact one of the flexures) to apply the driving force.

In the same or other embodiments, the recording head actuator may include a support supporting the head and at least one actuator adjusting lateral positioning of the head. The DAC assembly may include an actuator support coupled with the support of the recording head actuator and with the flexural pivot, whereby rotation of the flexural pivot about the hinge axis is translated to rotation of the head about the rotation axis. In these embodiments, the DAC assembly may further include a support block mounted to a base plate of the tape drive. Further, the flexural pivot may include flexures attached to the support block and to the actuator support, and the recording head actuator is suspended above or apart and adjacent the base plate by the actuator support so as to move with the flexures (e.g., free of interference from the tape drive deck or base plate as it is wholly supported by the DAC assembly).

DETAILED DESCRIPTION

The following describes a recording head actuator assembly that is configured for addressing problems associated with track misregistration (TMR) due to angular misalignment between the tape and the recording head or due to other problems such as issues with tape dimensional stability (TDS). Briefly, the recording head actuator assembly includes a recording head actuator supported within the assembly for rotation about a rotation axis passing through the recording head.

To this end, the recording head actuator assembly includes a dynamic azimuth control (DAC) assembly/mechanism that includes a flexure (or, alternatively, flexural) pivot mechanism that supports the recording head actuator and also includes a rotation driver (e.g., a linear voice coil actuator or motor) for actuation of the flexure pivot mechanism. Particularly, the rotation driver is controlled to selectively cause the flexure pivot mechanism to rotate about a hinge axis (coinciding with the rotation axis) to move the recording head actuator assembly, and, more specifically, a read/write head, through an angle of rotation about the rotation axis so as to correct for any detected angular misalignment or otherwise address TMR. While a variety of flexure pivot mechanisms may be utilized to implement the recording head actuator assembly, some preferred implementations use a flexure pivot or hinge configured as a cross strip pivot.

Figure 1:
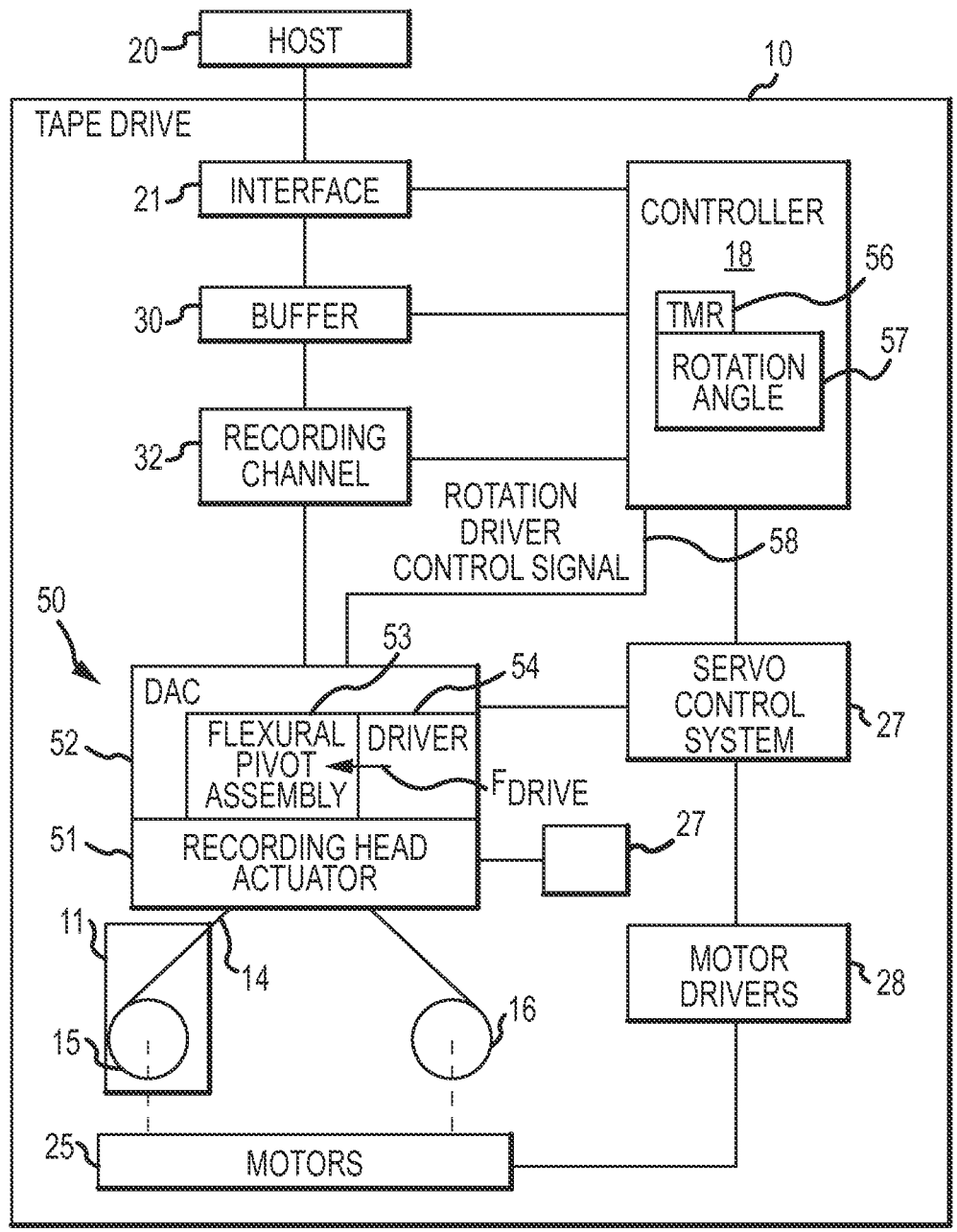
FIG. 1 is a functional block diagram of a tape drive including a recording head actuator assembly of the present description.

Before discussing assemblies for selectively rotating a recording head presented herein in more detail, it may be useful to disclose one representative environment in which these assemblies may be implemented. In this regard, FIG. 1 presents a schematic view of an exemplary tape drive 10 within which the recording head actuator assembly 50 may be implemented to rotate or angularly adjust positioning of one or more recording heads relative to magnetic tape media 14. For instance, the tape drive 10 may receive a magnetic tape cartridge 11 that includes a length of magnetic tape 14 (e.g., magnetic tape pack, magnetic tape media) wound on at least one reel 15. One or more controllers 18 of a recording system may be included for operating the tape drive 10 in accordance with commands received from a host system 20 received at an interface 21. The tape drive 10 may be coupled to the host system 20 in a number of manners such as directly, through a library, or over a network (e.g., via Small Computer Systems Interface (SCSI), Fibre Channel Interface, and the like). The tape drive 10 may be a standalone unit or form part of a tape library or other subsystem.

The magnetic tape cartridge 11 may be inserted into the tape drive 10 and loaded by the tape drive 10 so that the tape 14 winds around a reel 16 of the tape drive 10 (e.g., in addition to one or more rollers or the like) and so that at least one recording head actuator assembly 50 (e.g., tape head assembly) of the recording system reads and/or writes information with respect to the magnetic tape 14 as the tape 14 is moved longitudinally in first/forward and/or second/reverse opposed directions by one or more motors 25 past the recording head actuator assembly 50. For instance, the assembly 50 may include one or more heads, where each head includes a series of servo, read, and/or write elements (e.g., transducers), in a recording head actuator 51. The recording system may include a servo control or tracking system 27 to electronically switch from one head to another head, to seek and move the heads laterally relative to the tape 14, to position the heads at a desired location over the tape 14 and/or one or more tracks of the tape 14, to follow one or more desired tracks, and/or the like.

Figure 10:
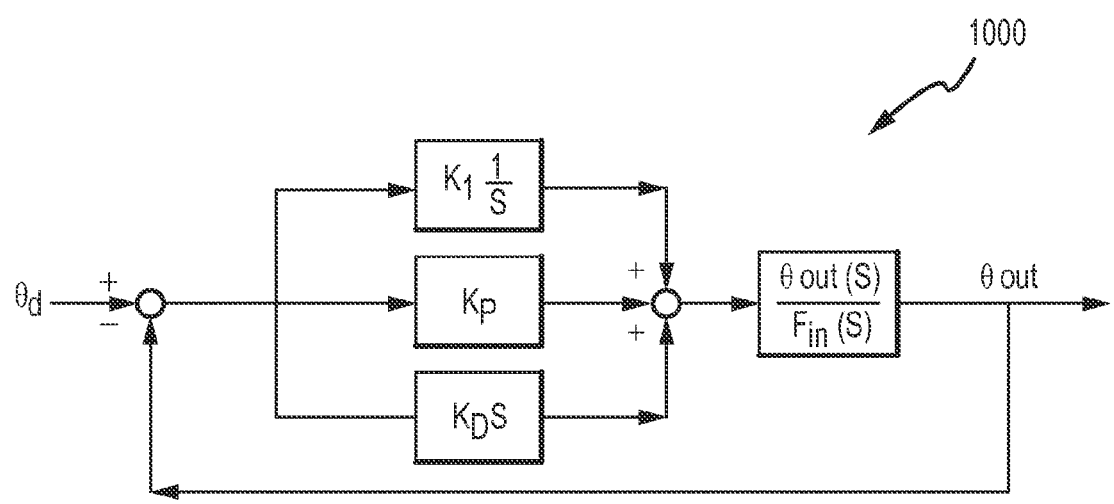
FIG. 10 is a block diagram of a control loop that may be used in controlling operations of the DAC assembly taught herein.

Additionally, the recording head actuator assembly 50 includes a dynamic azimuth control (DAC) assembly or mechanism 52 for selectively rotating the recording head actuator 51 so as to rotate the one or more heads through a rotation angle to correct reading/writing errors cause by the tape being at an unexpected azimuth angle. Particularly, the tape drive 10 may use sensors or other components to allow the controller 18 to monitor tape misregistration (TMR) 56 and to respond by determining a rotation angle (or range of angles) 57 that may be useful to correct for this determined TMR 56. Then, the controller 18 may function to generate and communicate as shown at 58 control signals to a rotation driver 54 of the DAC assembly 52 to cause it to actuate a flexural pivot assembly 53 by applying a driving force, $F_{Drive}$, upon a surface of this assembly 53, which causes the pivot assembly 53 to rotate about its hinge or pivot axis (not shown in FIG. 1). For example, see block diagram 1000 of FIG. 10 for a representative control loop. The recording head actuator 51 is supported in the drive 10 by the flexure pivot assembly 53 such that when it pivots so does the recording head actuator 51 (e.g., about a rotation axis passing through the head, with the rotation axis and pivot/hinge axis coinciding in many implementations).

The various components of the tape drive 10 may be incorporated or otherwise embodied within any appropriate housing (not shown). The servo control system 27 may also control the operation of the motors 25 through motor drivers 28 in response to instructions by the one or more controllers 18, where the controllers 18 may provide the data flow and formatting of data to be read from and written to the magnetic tape 14 (e.g., via employing a buffer 30 and a recording channel 32).

Figure 2:
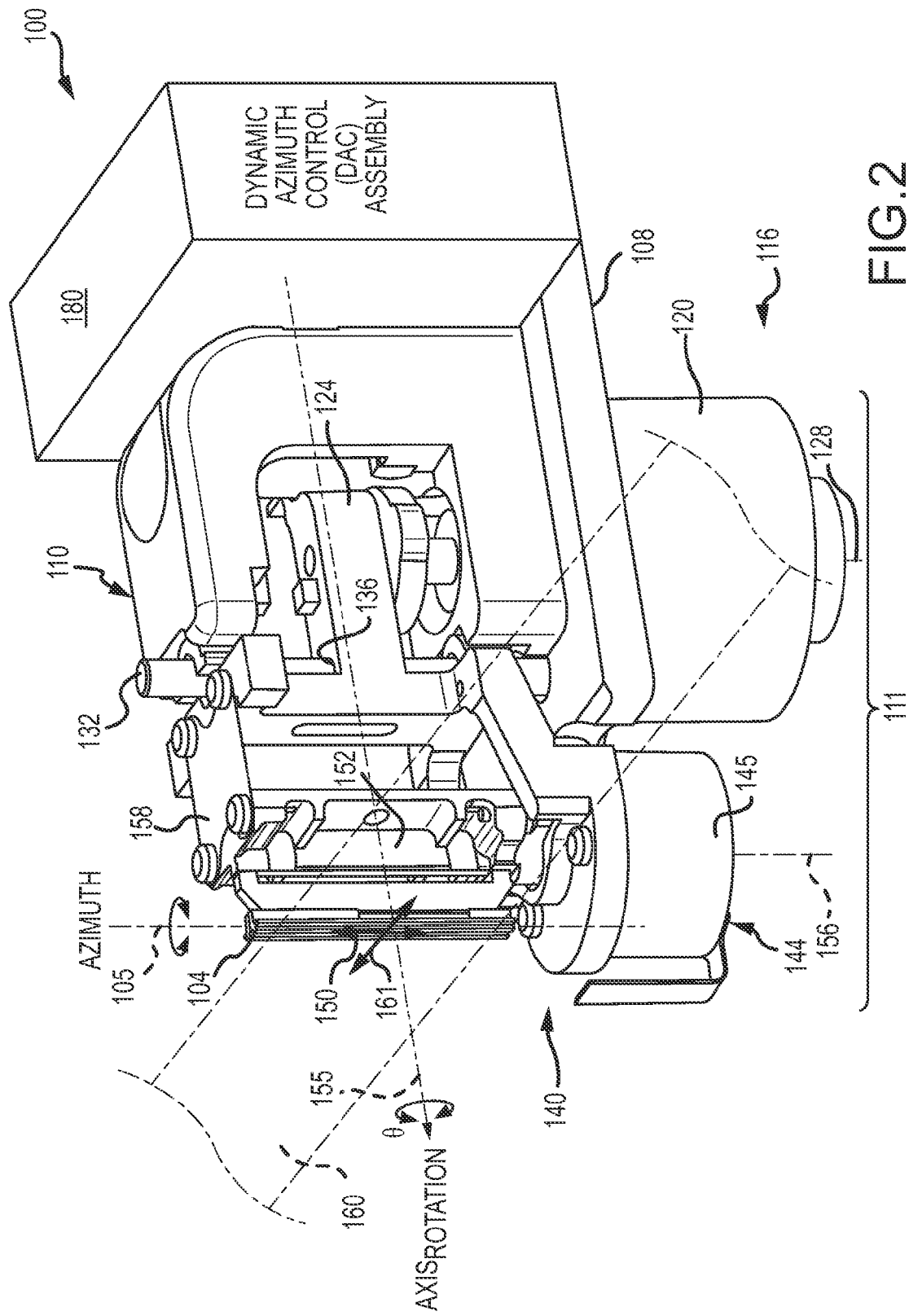
FIG. 2 is a perspective view of a recording head actuator assembly showing, in functional block form, a dynamic azimuth control (DAC) assembly or mechanism to rotate a recording head actuator about a rotation axis to address TMR.

Turning now to FIG. 2, one embodiment of a recording head actuator assembly 100 (e.g., which may be implemented as the assembly 50 of FIG. 1) that includes a recording head actuator 111 that is supported by and selectively rotated about a rotation axis, $Axis_{Rotation}$, as shown at 155 by a dynamic azimuth control (DAC) assembly 180. Particularly, the DAC assembly 180 may be affixed to head/motor support 110 or to a base plate 108 upon which the support 110 is mounted. The specific embodiments or implementations of the DAC assembly 180 are described in detail below.

The actuator 111 is illustrated as incorporating a linear actuator 144 for linearly adjusting at least one recording head 104 in a lateral direction along a path 150 (e.g., axis) that is perpendicular to a path 161 of movement of a length of magnetic tape 160 in front of the recording head 104. While not shown, the recording head 104 may include a plurality of read, write, and/or servo elements (e.g., transducers) configured to appropriately read data from and/or write data to the length of magnetic tape 160 as it moves in one of first and second opposite directions along the path 161 in front of the recording head 104. The recording head actuator 111 includes a base plate 108 of any appropriate size and shape to which one or more components of the actuator 100, including the support 110, may be secured, while the DAC assembly 180 is used to support the actuator 111 and also to secure the actuator 111 to a data storage device (e.g., tape drive 10 of FIG. 1).

The recording head actuator 111 may include a number of positioning subsystems operable to move or otherwise manipulate the recording head 104 into any appropriate position(s), such as to allow the read/write/servo elements to more accurately follow data and/or servo tracks or the like on the magnetic tape 160. One positioning subsystem may be a coarse travel subsystem 116 that is configured to linearly move the recording head 104 in the first and second opposing directions along the path 150 over a range of travel (e.g., by the servo control system 27 of tape drive 10 of FIG. 1). In one embodiment, the coarse travel subsystem 116 may include a coarse travel actuator 120 (e.g., motor) that is operable to move a coarse travel carriage 124 in one of first and second opposing linear directions along an axis 128 that is substantially parallel to the path 150. For instance, the coarse travel carriage 124 may be configured to ride along a guiding shaft 132 (e.g., via inserting the guiding shaft 132 through an aperture 136 of the carriage) to guide linear movement of the coarse travel carriage 124 upon activation of the coarse travel actuator 120.

Another positioning subsystem of the recording head actuator 111 may be a fine travel subsystem 140 that is configured to linearly position the recording head 104 along the path 150 over a range of travel that is less (e.g., finer) than that of the coarse travel subsystem 116. The fine travel subsystem 140 includes the linear actuator 144, which includes a housing 145 that is rigidly (e.g., non-movably) secured to or relative to the coarse travel carriage 124 so that linear movement of the coarse travel carriage 124 induces corresponding linear movement of the fine travel subsystem 140. In this regard, the coarse travel subsystem 116 may be utilized by a servo control system (e.g., system 27 of drive 10 of FIG. 1) to generally move the recording head 104 into a desired area over the tape 160 while the fine travel subsystem 140 may be utilized by the servo control system to "fine tune" the position of the recording head 104.

Specifically, the linear actuator 144 is configured to linearly move a fine travel carriage 152 to which the recording head 104 is fixedly secured (e.g., or otherwise non-movable relative to) along an axis 156 that is parallel to the path 150. Thus, linear movement of the fine travel carriage 152 along the axis 156 induces corresponding movement of the recording head 104 along path 150 (e.g., to allow the recording head 104 to dynamically follow tracks on the tape 160). One or more fine guiding flexures 158 (e.g., planar leaf springs constructed of sheet steel or the like) secure the fine travel carriage 152 to the coarse travel carriage 124 to support the recording head 104 and flex in response to movement induced by the linear actuator 144.

To correct for TMR due to angular misalignment of the tape 160 and head 104 or due to TDS, the recording head actuator assembly 100 includes the DAC assembly 180 to support the recording head actuator 111. Particularly, the DAC assembly 180 may be operated, such as with controller 18 of drive 10 of FIG. 1, in response to a detection that the azimuth angle, as measured between line 105 passing along and through the linearly arranged read/write elements in head 104 and the travel path/direction 161 of the tape 160, is unacceptably large to provide proper reading or writing. In such cases, the DAC assembly 180 may be operated to rotate the support 110 and, thus, the entire recording head actuator 111 about a rotation axis, $Axis_{Rotation}$, shown at 155 as passing through the head 104 and its read/write elements, by some predefined amount, e.g., through an angle of rotation, $\theta$, to correctly align the read/write elements (or servo readers) with tracks of the tape 160. In some embodiments, the DAC assembly operates at a 60 Hz frequency to provide oscillations of plus/minus 0.5 degrees to move the head 104 (and actuator 111) through a range of angles, $\theta$, of −0.5 to 6.5 degrees (i.e., an angular range of about 7 degrees total with clockwise rotation in FIG. 2 being positive (e.g., angle the head toward the right or the direction of tape travel 161 when the tape 160 is moving to the left in the figure)).

In better understanding the following description of a recording head actuator assembly, it may be useful to understand that, as with many engineering or design projects, the assembly's creation was governed by several design goals and constraints. Some of these constraints originate from the existing recording head actuator design and desire that the DAC assembly be adapted to work well with this existing component and fit within existing tape drive housings. Further, one goal or design constraint was to build a DAC assembly or mechanism that will allow the recording head to track the tape's position in the azimuth direction. The DAC assembly, in this regard, was also designed to be able to rotate the recording head from −0.5 to 6.5 degrees as well as changing angles of plus/minus 0.5 degrees at a frequency up to about 60 Hz.

It was determined that flexural pivots would be useful within the DAC assembly. A flexure is a mechanical element that behaves in a geometrically well-defined motion in accordance to long beam theory. This well-defined motion is achieved through an application of force (e.g., the $F_{Drive}$ or $F_M$ herein) to compliant elements (e.g., one of the flexures in the flexural pivot assembly or mechanism). Further, it is known by those in the field of mechanical design that flexures allow for the following two goals to be accomplished: (1) provide a precise displacement upon application of a specific applied force; and (2) provide a precisely known force upon application of a specific applied displacement. The precision aspect of flexures is extremely beneficial for the design of a DAC assembly due to the small rotational displacements being desired as output of the DAC assembly at such a high frequency.

Flexures provide a number of advantages that may be useful for a DAC assembly including, but not limited to: (1) simple and inexpensive to manufacture and assembly; (2) substantially wear-free (unless a fatigue crack develops); (3) mechanical leverage is easily implemented if needed; (4) displacements are smooth and continuous (e.g., flexures have been shown to readily produce predictable and repeatable motions); (5) failure mechanisms are well understood; (6) can be designed to be insensitive to thermal variations and mechanical disturbances; and (7) for small distortions, the relationship between force and displacement is linear. However, it should be kept in mind in using a flexural pivot assembly in the DAC assembly that there are disadvantages to using flexures such as: (1) accurate prediction of force-displacement characteristics requires accurate knowledge of the elastic modulus and geometry of the flexures; (2) at significant stresses, there will be some hysteresis in the stress-strain characteristics of most materials; (3) flexures are restricted in the length of translation for a given size and stiffness; (4) flexures cannot tolerate large loads; (5) accidental overload can heavily affect fatigue life; and (6) flexures are prone to harmonic effects due to surrounding excitation frequencies.

As mentioned earlier, the rotation driver used to actuate the flexural pivot mechanism may take a number of forms to implement a useful DAC assembly. Based on the force calculation, the inventors determined that other rotation drivers may be used such as piezocrystals, stepper motors, and the like. However, it was determined that in many cases it may be useful to use a linear voice coil actuator (or voice coil motor (VCM)) such as those commonly available from a wide range of manufacturers/distributors. In part, a linear voice coil actuator was chosen due to the availability of these actuators with a small size, at a relatively low cost, with an impressive frequency actuating capability, with high accuracy in positional resolution, and based on their long track record of successful use in a wide variety of devices (including devices in the data storage industry). Further, linear voice control actuators are relatively simple to use in the design process due to their linear motion (e.g., plunger extends and retracts linearly when the motor is energized or receives "control signals" from a controller). The DAC assembly uses this linear motion to provide a driving force or actuation force for a flexural pivot mechanism, e.g., uses the flexural pivot mechanism to translate the linear motion of the voice control actuator into rotational motion to rotate a recording head.

As discussed above, the flexural pivot assembly 53 of the DAC 52 of FIG. 1 can be implemented using a variety of flexures arranged to provide a hinge axis coinciding with the rotation axis of the recording head (or recording head actuator 51 in FIG. 1) while also providing physical support of the recording head (e.g., while its other actuators position the recording head's elements relative to tracks of a tape). In some embodiments, though, it was determined that a cross strip pivot design may be useful in the flexural pivot assembly. The cross strip pivot is a flexural pivot design that is useful for providing oscillatory motions, and this pivot design is relatively easy to construct due to the simple nature of the crossing flexures.

Figure 3A:
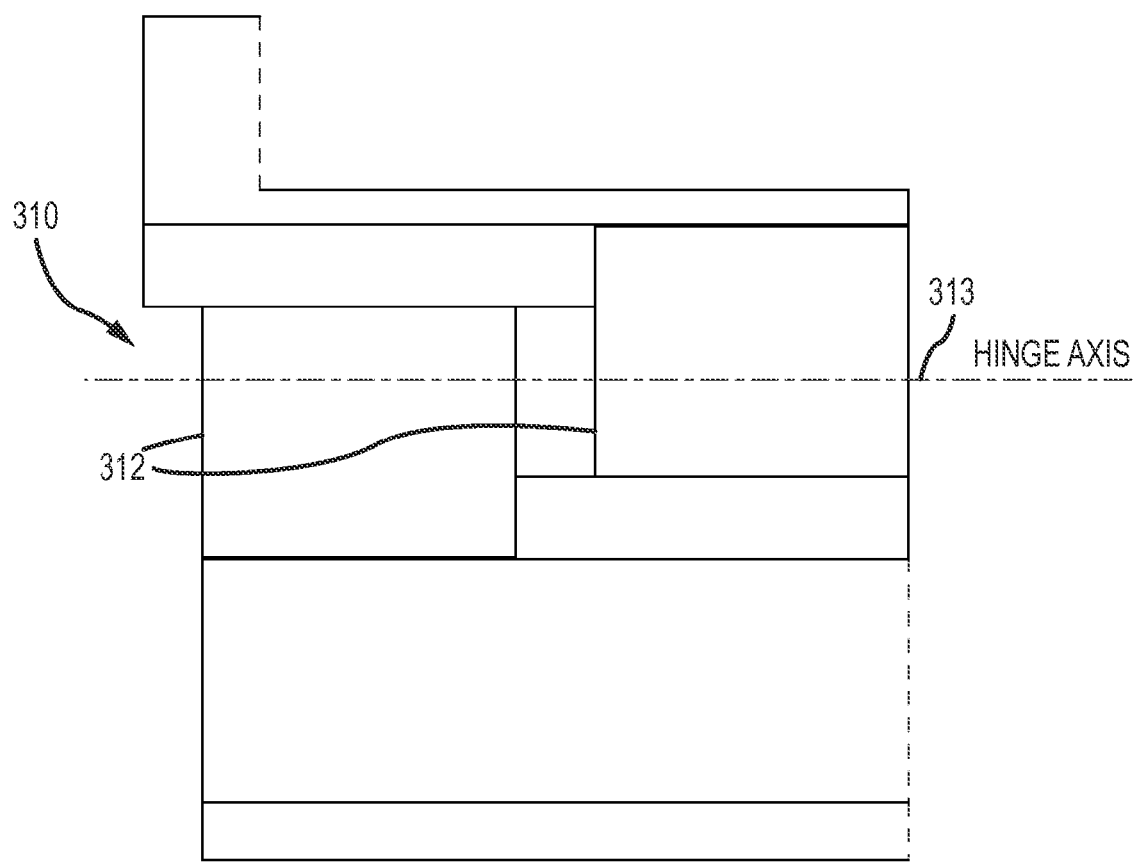
FIGS. 3A-3C illustrate with a perspective view and three side views, respectively, cross strip pivot designs that can be included in the flexural pivot assembly of the present description including that of the tape drive in FIG. 1.
Figure 3B:
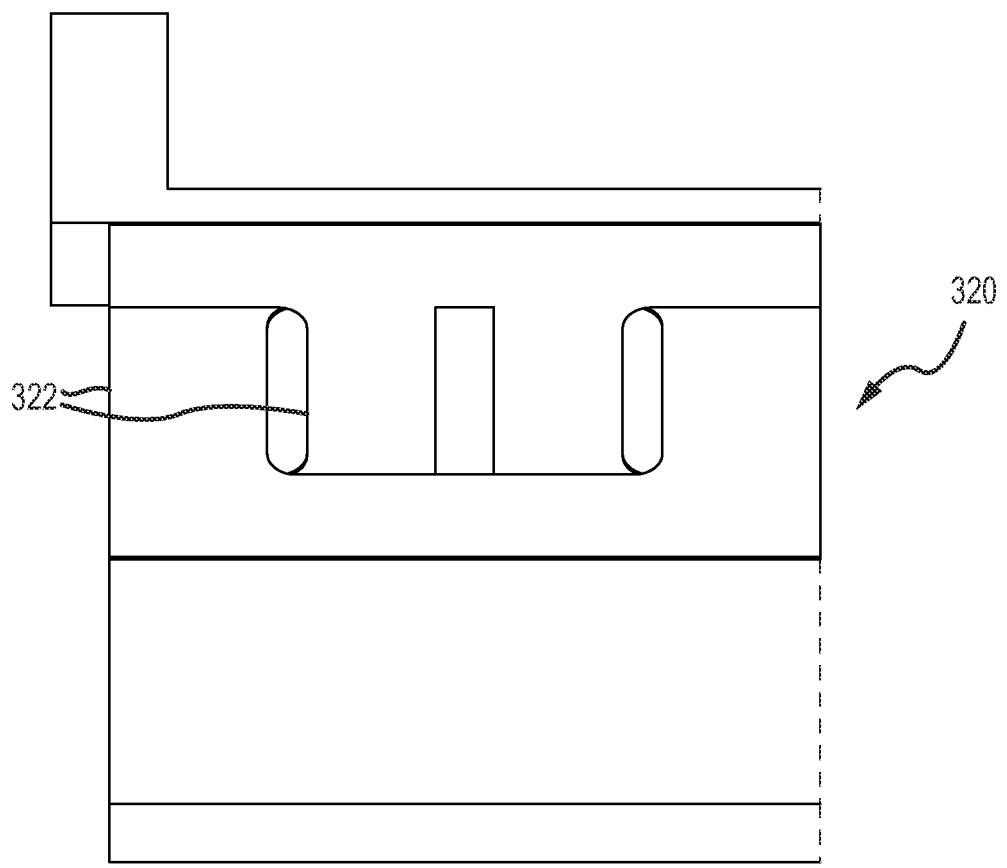
Figure 3C:
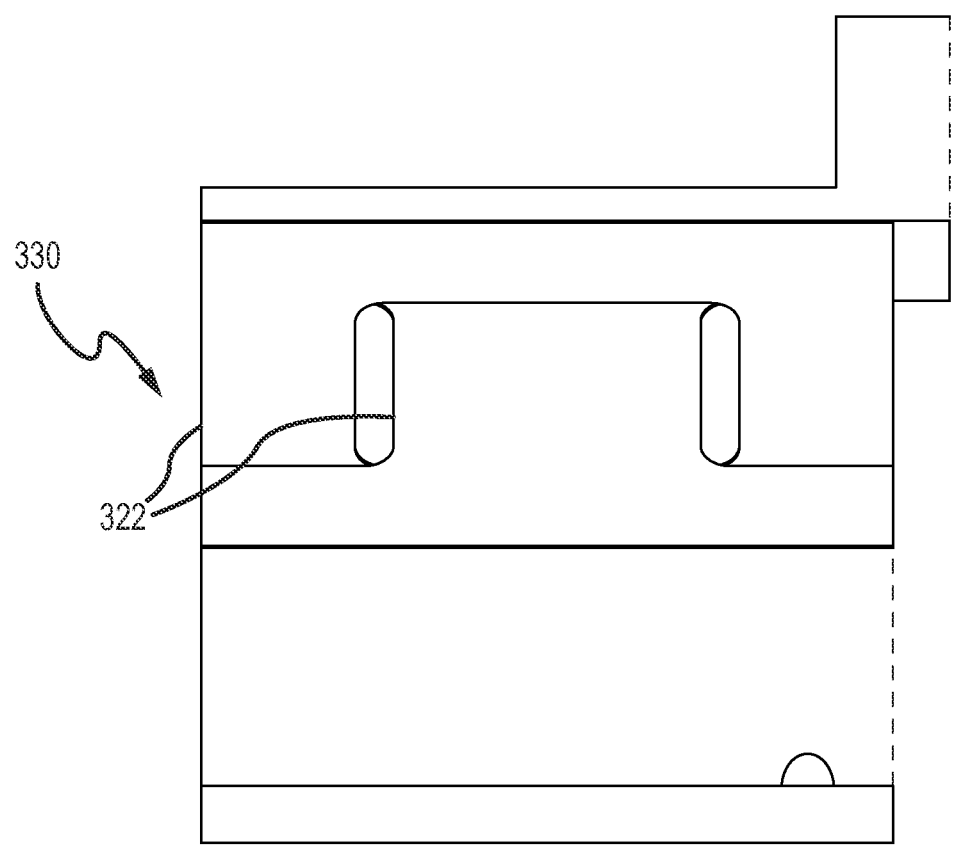

With a decision made to use a cross strip pivot in the assembly 53, it will be understood that there are a number of cross strip pivot designs or implementations that can be used in the assembly to provide the desired oscillatory motion when acted upon by a driving force. FIGS. 3A-3C illustrate three side views of three cross strip pivot designs for use in the assembly 53. FIG. 3A provides a side view of one cross strip pivot 310 provide by flexures 312 arranged in the configuration shown to have a hinge axis 313. The rotational or hinge axis 313 is assumed, as shown, to be about the axis of intersection between the strips or flexures 312, which are mounted on a block and used to support a component (such as an actuator support) with these two components shown with dashed lines in FIGS. 3A-3C. The flexure pivot 310 may be useful in some cases due to its very simple design that may facilitate manufacture and assembly, but the pivot 310 may have too low of a torsional stiffness about the vertical axis for all embodiments of a DAC mechanism.

With this in mind, FIG. 3B illustrates another cross strip pivot 320 configuration that may be useful in a flexural pivot assembly. The strips or flexures 322 are arranged in the pivot 320 to add torsional stiffness relative to pivot 310. Because the deflections of each hinge pair are identical in pivot 320, it makes no difference to the operation of the spring if the central pair is joined together as shown in the cross strip pivot 330 of FIG. 3C with its flexures/strips 332. The pivot 330 may be thought of as a three-strip hinge that acts in an equivalent manner to pivot 320. Connecting the central strips also may help alleviate issues that could occur due to tolerance stacking as less parts are made and assembled in pivot 330. Based on this discussion, the inventors describe one useful DAC mechanism below that utilizes the cross strip pivot design shown in pivot 330 of FIG. 3C as it provides good torsional stiffness due to the presence of more than two beams or strips of flexures and because it is easy to manufacture with only two flexures (that are assembled to provide pivot 330).

Figure 4:
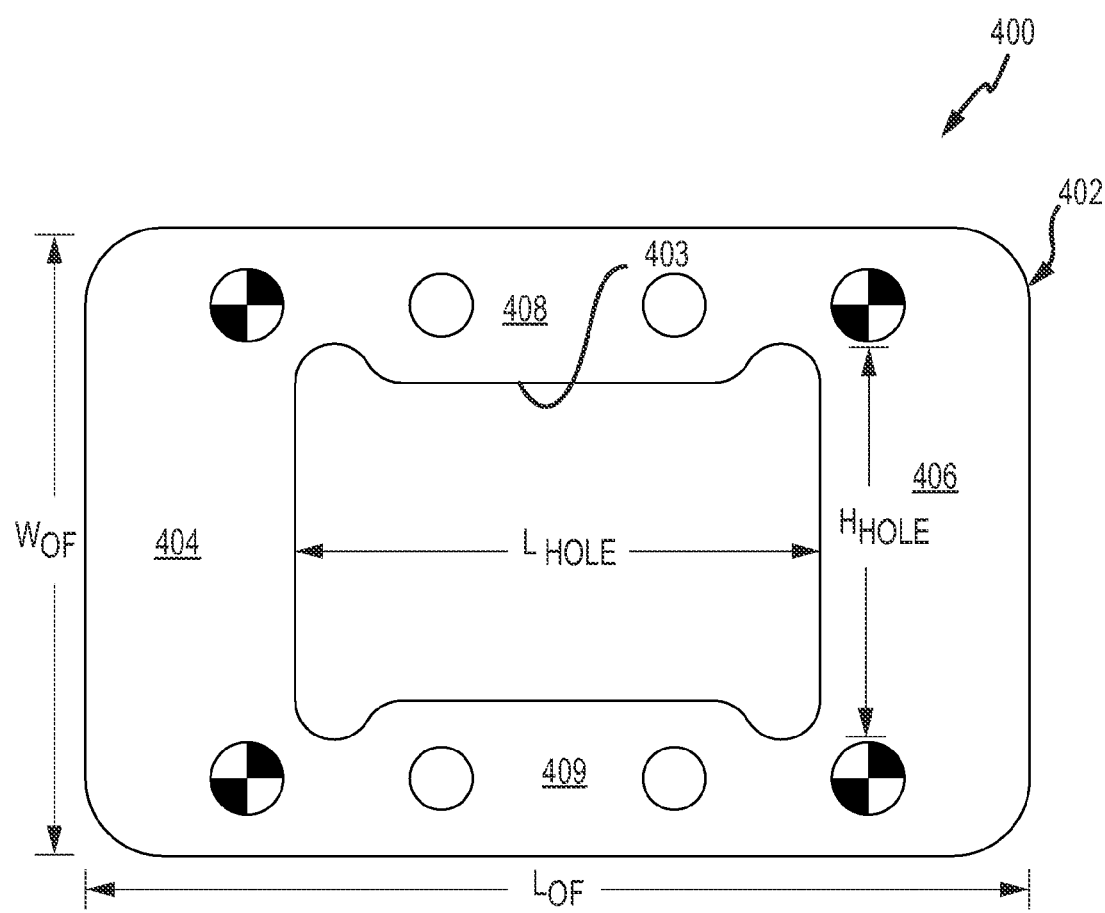
FIG. 4 is a plan view of one embodiment of an outer flexure for use in providing a cross pivot for a flexural pivot assembly.
Figure 5:
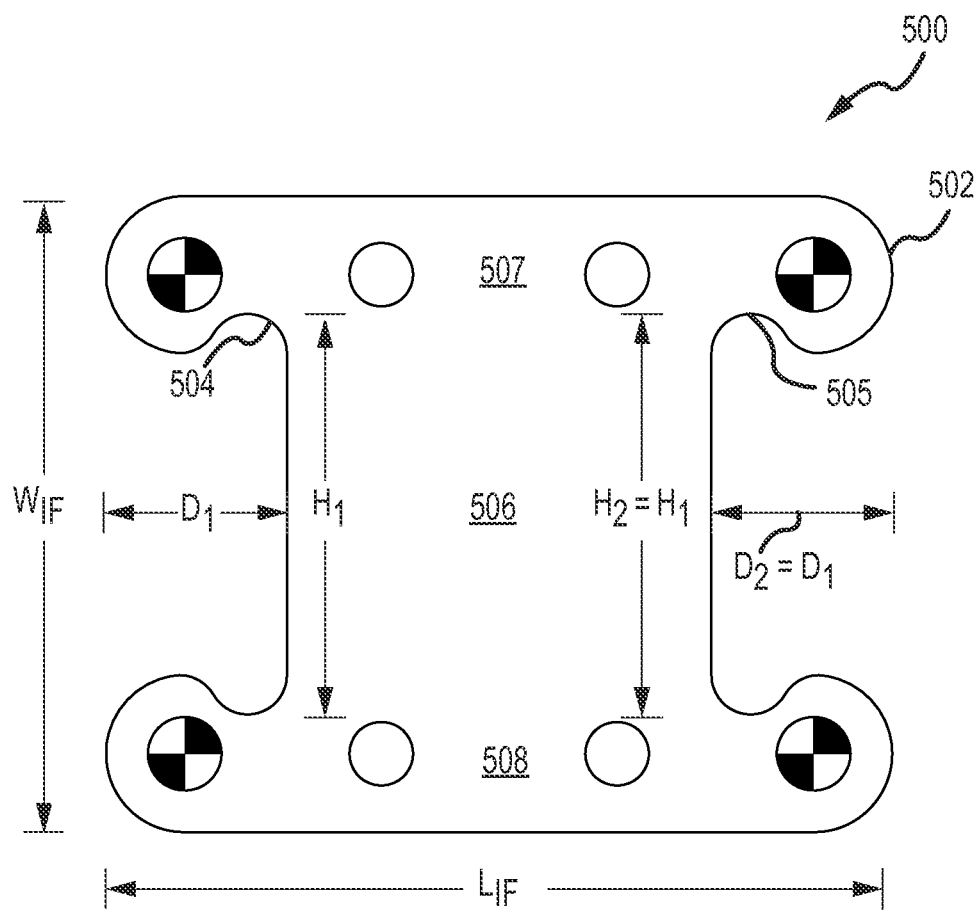
FIG. 5 is a plan view of one embodiment of an inner flexure for use with the outer flexure of FIG. 4 to provide a cross pivot for a flexural pivot assembly.

FIGS. 4 and 5 illustrate, respectively, plan views of an inner flexure 400 and an outer flexure 500 that may be used in combination in a flexural pivot assembly to provide a flexure pivot in the form of a cross strip pivot. As shown, the outer flexure 400 has a rectangular body 402 that is relatively thin, e.g., 0.002 to 0.01 inches thick or the like with one embodiment using a thickness of 0.005 inches. The body 402 may be formed of a variety of metals that are useful for their spring constant values or other physical qualities that make them well suited for use as a flexure. In some embodiments, the body 402 is formed of a steel such as a stainless steel (SS) with one particular implementation using 304 SS.

The body 402 has a width, $W_{OF}$, and a length, $L_{OF}$, that may vary to practice the invention and will be chosen to allow the pivot to fit within a particular tape drive and space available within that tape drive housing. In one embodiment, the width, $W_{OF}$, was chosen to be in the range of 0.7 to 1.0 inches (e.g., about 0.810 inches may be useful) while the length, $L_{OF}$, was in the range of 1 to 1.5 inches (e.g., about 1.216 inches may be useful). In the body 402, a hole or passageway 403 is provided through a center portion of the body, and the hole 403 has a rectangular shape (with rounded corners) having a length, $L_{Hole}$ (in the range of 0.5 to 0.75 inches such as 0.676 inches in one embodiment) and a height (or width), $H_{Hole}$ (in the range of 0.25 to 0.5 inches such as 0.410 inches in one embodiment). The size of the hole 403 is chosen to allow the beam of the inner flexure to pass through the body 402 and also defines the sizes of the two end beams or strips 404, 406. For example, each may have a width in the range of 0.15 to 0.50 inches (e.g., about 0.270 inches in one embodiment) while having a height similar to or matching the height, $H_{Hole}$, of the hole 403. The flexure 400 also includes mounting members or arms 408, 409 that extend between and interconnect the two beams/strips 404, 406 on either sides of the hole 403 and that are configured with a number of openings/holes for receiving fasteners to mount the flexure within a flexural pivot assembly.

As shown, the inner flexure 500 has an "I" shaped body 502 (or shaped like a cross sectional view of an I beam) that is relatively thin, e.g., 0.002 to 0.01 inches thick or the like with one embodiment using a thickness of 0.005 inches. The body 502, as with body 402, may be formed of a variety of metals that are useful for their spring constant values or other physical qualities that make them well suited for use as a flexure. In some embodiments, the body 502 is formed of a steel such as a stainless steel (SS) with one particular implementation using 304 SS.

The body 502 has a width, $W_{IF}$, and a length, $L_{IF}$, that may vary to practice the invention and will be chosen to allow the pivot to fit within a particular tape drive and space available within that tape drive housing. In one embodiment, the width, $W_{IF}$, was chosen to be in the range of 0.7 to 1.0 inches (e.g., about 0.810 inches may be useful) while the length, $L_{IF}$, was in the range of 1 to 1.5 inches (e.g., about 1.216 inches may be useful). In some embodiments, these outer dimensions of the two flexures 400 and 500 are identical (or equal within manufacturing tolerance). In the body 502, a pair of recesses or recessed surface 504, 505 is provided at an outer edge near the center portion of the body 502, and the recesses 504, 505 each has a generally square or rectangular shape (with rounded corners) having a depth, $D_1$ and $D_2$ (in the range of 0.25 to 0.50 inches such as 0.338 inches in one embodiment) and a height, $H_1$ and $H_2$, (in the range of 0.25 to 0.5 inches such as 0.410 inches in one embodiment). The sizes of the recesses 504, 505 match and were chosen to define the beam or strip 506 of the body 502 and to allow the beam/strip 506 of the inner flexure 500 to pass through the hole 403 of the body 402 of the outer flexure (and the hole 403 and beam 506 heights may be equal or nearly so). The inner flexure 500 also includes mounting members or arms 507, 508 that extend outward in both directions from ends of the beam/strip 506 and are configured with a number of openings/holes for receiving fasteners to mount the flexure within a flexural pivot assembly.

To assembly a pivot with the flexures 400, 500, the I-shaped inner flexure 500 will be slid through the hole 403 in the outer flexure 400, and opposite arms 408, 409 and 507, 508 of the flexures 400, 500 are fastened to a beam and to a mounting or support block (as discussed below) to create a cross strip pivot. Typically, the width of the beam/strip of the I-beam shaped inner flexure 500 is equal to twice the width of the two smaller beams/strips of the outer flexure 400 (formed with a body 402 in the form of a rectangular window sheet) such that there are effectively four flexures (or four beams/strips) in a pivot formed with the outer and inner flexures 400 and 500. Note, the width of the opening 403 in the sheet/body 402 is preferably equal to the width of the beam/strip 506 in the sheet/body 502 as this simplifies manufacturing and also allows for the I-shaped inner flexure 500 to be slid into the hole 503 without plastically deformation, which could compromise the material properties of the body 502 of the inner flexure.

Figure 6:
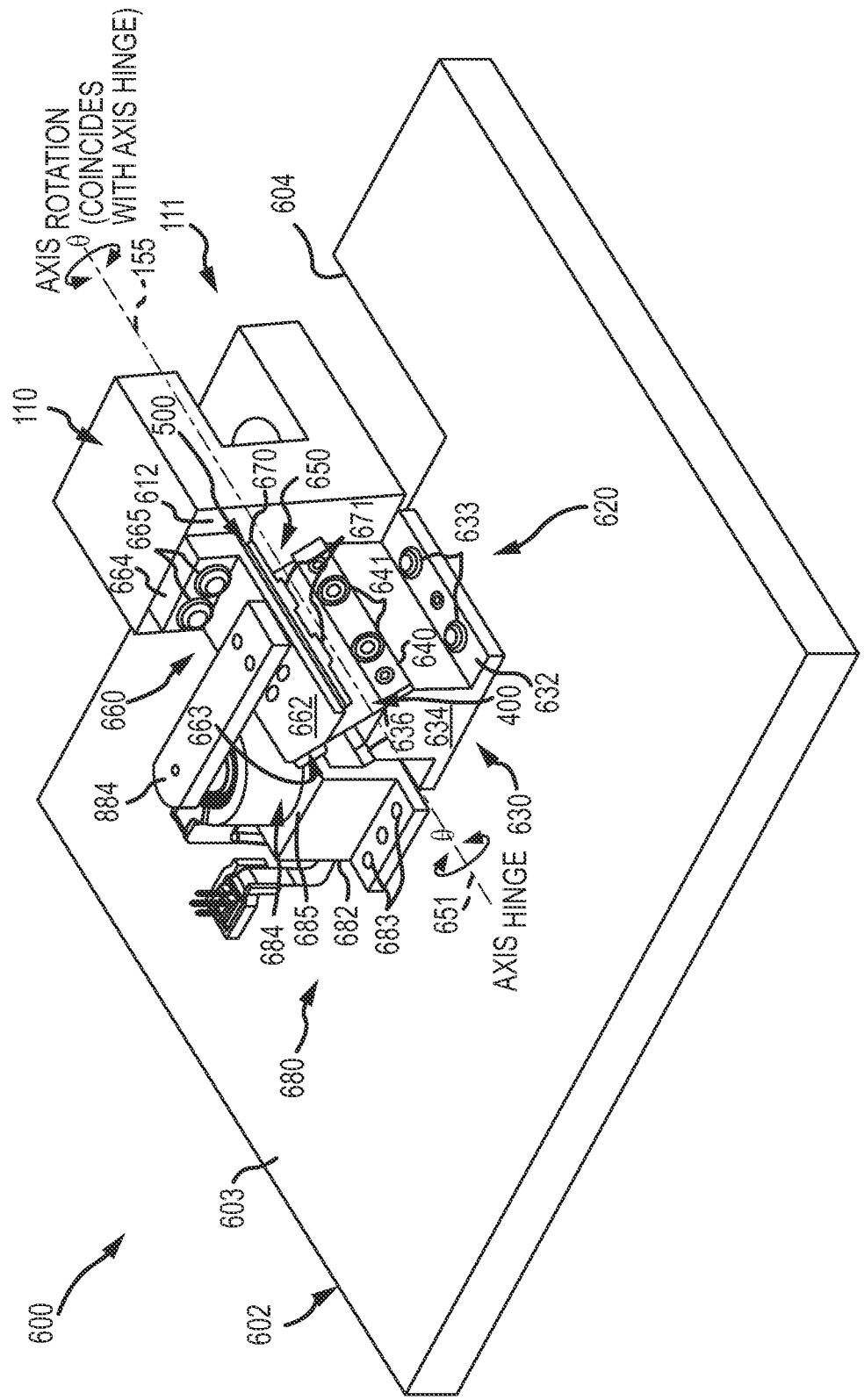
FIG. 6 is a top perspective view of a recording head actuator assembly, with the read/write head, which would be provided on the support of the actuator, not shown along with fine and coarse actuator motors so as to simplify explanation of the DAC assembly.
Figure 7:
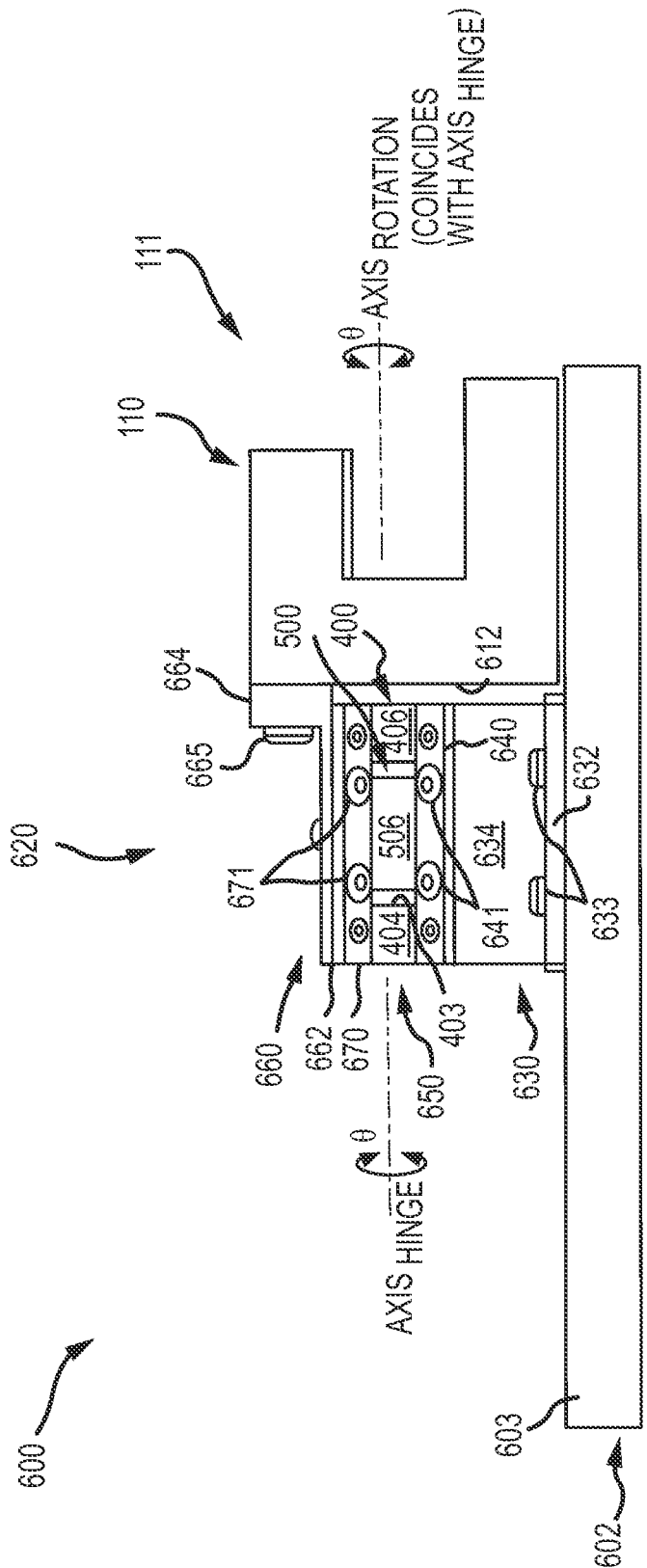
FIG. 7 illustrates a side view of the recording head actuator assembly of FIG. 6.
Figure 8:
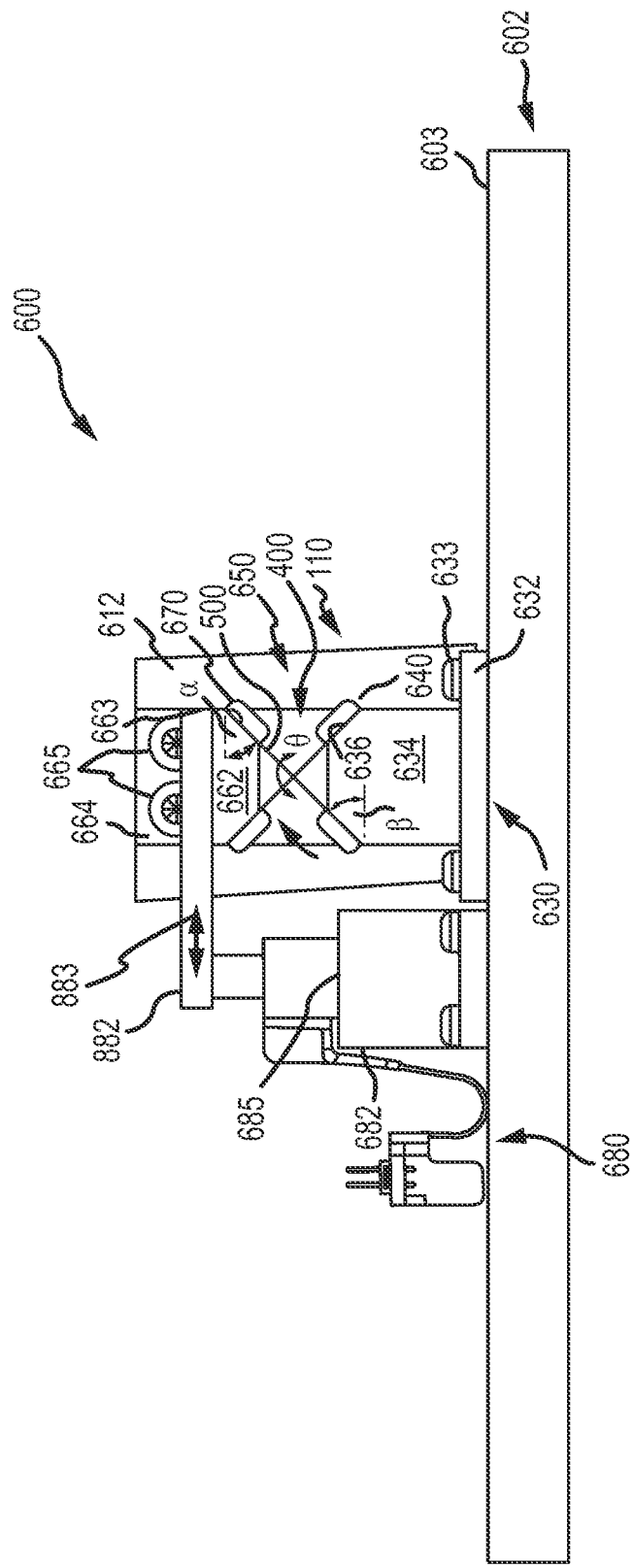
FIG. 8 is an end view of the recording head actuator assembly shown in FIGS. 6 and 7.

At this point in the description, it may be useful to describe one useful implementation of a DAC assembly that makes use of the two flexures 400, 500 to provide selective rotation of a recording head to correct for potential TMR-based error. FIGS. 6-9 illustrate a recording head actuator assembly 600 that can be operated to rotate a recording head (not shown but would be mounted on exposed surfaces of actuator support 110 of actuator 111 such as shown in FIG. 2). FIG. 6 is a top perspective view of the recording head actuator assembly 600 (with the read/write head, which would be provided on the support 110 of the actuator 111, not shown along with fine and coarse actuator motors so as to simplify explanation of the DAC assembly 600). FIG. 7 illustrates a side view of the recording head actuator assembly 600 of FIG. 6 while FIG. 8 is an end view of the recording head actuator assembly 600.

Figure 9:
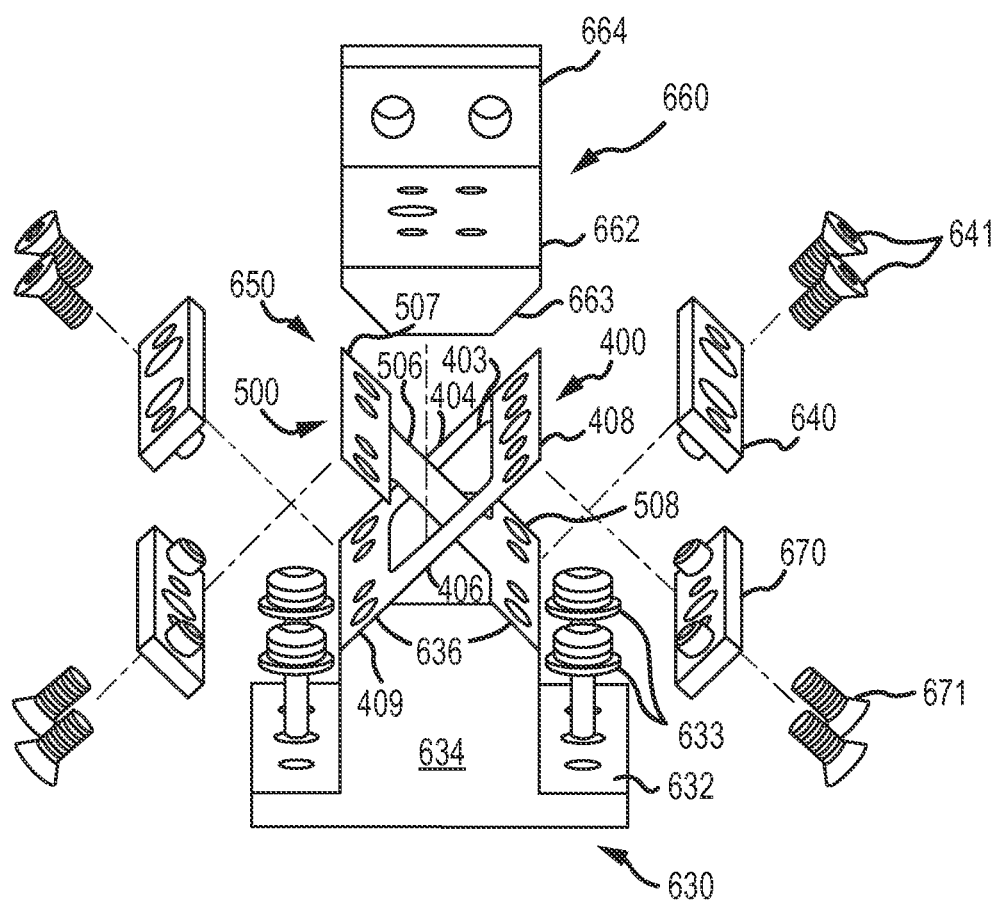
FIG. 9 is an exploded view of a portion of the DAC assembly of FIGS. 6-8 showing the cross pivot and its mounting within the DAC assembly in further detail.

FIG. 9 is an exploded view of a portion of the DAC assembly 620 of FIGS. 6-8 showing the cross pivot 650 and its mounting arrangement within the DAC assembly 620 in further detail.

As shown, the recording head actuator assembly 600 includes a dynamic azimuth control (DAC) assembly 620 that is used to support and, when needed (e.g., operated by positional control elements in a tape drive), to rotate an actuator 111 (which, when installed in a drive would include a read/write head as shown in FIG. 2). The assembly 600 includes a base plate or deck 602 with a planar mounting surface 603. The DAC assembly 620 is mounted onto this surface 603 of the base plate 602 while the support 110 of the actuator 111 is supported by the DAC assembly 620 in a cantilevered manner over a recessed surface 604 in an end of the base plate 602 (e.g., to allow unobstructed rotation of the support 110 and to provide space for actuator motors and other components of the actuator 111 (e.g., see head, motors, and other components of actuator 111 shown in FIG. 2)).

The DAC assembly 620 includes a support block 630 with mounting plates 632 extending laterally outward from a lower planar surface of a central body 634. Fasteners 633 such as screws are used to fasten the support block 630 via the mounting plates 632 to the upper surface 603 of the base plate 602. The body 634 of the support block 630 extends upward a distance (or support block height such as a value in the range of 0.3 to 0.7 inches or the like) from the upper surface 603. A pair of spaced apart, angular pivot support surfaces 636 are provided on the upper portion of the support block body 634. As shown in FIG. 8, these surfaces 636 may be provided at an angle, β, chosen to suit the design of the pivot 650 (e.g., an angle of 30 to 60 degrees), and, in this regard, the flexural pivot 650 is configured as a cross strip pivot such that the angle, β, of support surfaces 636 is chosen to be about 45 degrees (e.g., 45 degrees plus or minus a predefined tolerance such as 0.5 degrees or the like) to position planar flexures 400, 500 at this same angle or angular orientation within the DAC assembly 620.

As shown in FIGS. 6-9, the DAC assembly 620 includes a flexural pivot 650 in the form of a cross strip pivot. More specifically, the DAC assembly 620 includes the outer flexure 400 that is mounted, via mounting member 409 and one of the pair of lower washers 640 and fasteners 641, to one of the mounting surfaces 636 of the support block body 634. Further, the DAC assembly 620 includes the inner flexure 500 that is mounted, via mounting member 508 and one of the pair of lower washers 640 and fasteners 641, to one of the mounting surfaces 636 of the support block body 634. The two flexures 400, 500 are planar sheet elements and extend across each other at 45 degree angles with the beam/strip 506 of the inner flexure passing through the window/opening 402 in the outer flexure 400 (e.g., between beams or strips 404, 406 of the outer flexure).

The DAC assembly 620 further includes an actuator support 660 that includes an elongate beam 662 attached to the flexural pivot 650 and includes an end member 664. For attachment and support of the flexural pivot 650, the beam 662 includes angular mounting surfaces 663 facing toward the support block 634 and its mounting surface 636. The mounting surfaces 663 may be provided at an angle, a, relative to a planar bottom surface of the beam 662 in the range of 30 to 60 degrees to suit particular pivot designs with this angle matching that of the other mounting surfaces 636 at 45 degrees plus or minus a defined tolerance (0.5 degrees or the like) to maintain the flexures 400, 500 at 45 degrees to provide the cross strip pivot 650.

The flexures 400, 500 are affixed to (and support) the beam 662 at angular mounting surfaces 663 via the pair of upper washers 670 and fasteners 671, which pass through holes in the mounting members 408, 507 of the flexures 400, 500 and into the body of the beam 662. The support 110 of the recording head actuator 111 is, in turn, attached to the end member 664 of the actuator support 660 at side/surface 612 of the support 110 via fasteners 665 that pass through the end member 664 and into the body of the support 110.

With this mounting and pivot configuration in the DAC assembly 620, the hinge axis, $Axis_{Hinge}$, of the flexural pivot 650 coincides with a line corresponding to an intersection of planes passing through the planar flexure 400, 500 (a line identifying where the two flexures 400, 500 cross each other in the pivot 650). When the flexural pivot 650 is actuated, it rotates through a rotation angle, θ, about the hinge axis, $Axis_{Hinge}$. Significantly, the support 110 of the recording head actuator 111 is coupled to the pivot 650 via the actuator support 660 such that the rotation axis, $Axis_{Rotation}$, passes through a recording head (not shown in FIGS. 6-9 but shown in FIG. 2 at 104) as well as support 110, and this axis, $Axis_{Rotation}$, coincides with the rotation axis, $Axis_{Hinge}$, of the two flexures 400, 500 of the flexural pivot 650. More specifically, the support 110 and a head mounted on the support 110 rotates through an identical angular rotation or angle, θ, as the pivot 650 with arrangement shown with the recording head actuator assembly 600 of FIGS. 6-9. As discussed, the range of angular movement may be −0.5 to 6.5 degrees or some other range of movements useful for addressing read/write errors with rotation of the recording head relative to the tape passing by the assembly 600 in a tape drive (as shown in FIGS. 1 and 2).

For actuation or driving the flexural pivot 650, the DAC assembly 620 includes a rotation driver 680. As shown in FIGS. 6 and 8, the rotation driver 680 is provided with a motor mount 682 that is affixed with fasteners 683 to the upper surface 603 of the base plate 602 so as to be adjacent a side of the support block 634. Further, the rotation driver 680 includes a linear voice control motor or actuator 684 with a plunger 882. The motor mount 682 includes an upper support surface or side 685 that may be angled relative to the planar upper surface 603 of the plate 602 at an angle, α, but this angle, α, may be 0 degrees as shown (e.g., with surface 603 being parallel to surface 685) such that plunger 882 moves in and out, as shown with arrows 883. The exposed end of the plunger 882 is in contact with one of the cross arms or mounting members of the flexures to apply a driving force, FD or $F_M$, on the flexural pivot 650 with the movements 883 (when control signals are provided to the motor 684 to adjust the angle of the recording head). As shown, the connection between the plunger 882 and the flexural pivot 650 is provided with a drive beam or rod 884, which is mounted in a cantilevered manner from an outer or upper surface of beam 662 of actuator support 660 such that a cantilevered end of the drive beam or rod 884 is in contact with an end of plunger 882 to move 883 with the plunger 882 so as to cause the flexural pivot 650 to rotate through angle, θ.

In this example, the angle, α, is in the range of −5 to +5 degrees (e.g., 0 degrees being preferred to apply the force, FD, in a direction as shown with arrow 883. Further, in this example, the end of the plunger 882 abuts the drive rod 884 which is interconnected to the flexures 400 and 500 via beam 662 to create the rotation, θ, about the hinge axis, $Axis_{Hinge}$, of the flexural pivot 650 (and concurrently to drive the recording head to rotate about the rotation axis, $Axis_{Rotation}$). In other cases, the plunger 882 may contact one of the inner or outer flexures 500 or 400 to actuate the pivot 650 (e.g., if the angle, α, were not about 0 degrees as shown). Note, the materials used for the support block, the actuator support, and the motor mount 682 may vary to practice the invention with some useful embodiments using stainless steel, aluminum, or other metal compatible with the material(s) used for the flexures 400, 500 (at least at mating surfaces between the flexure and supporting components).

From a review of the above discussion and FIGS. 4-9, it will be appreciated that some modifications were performed to the base plate of the recording head actuator to achieve compatibility with the DAC assembly and its flexural pivot. An extrusion was provided on the rear of the base plate, and this was provided to ensure support at the connection points of the recording head actuator (or its head support) to the actuator support of the DAC assembly (e.g., the beam which, in turn, is attached to the upper mounting elements of the flexural pivot). Two tapped holes were provided to fasten the support block to the base plate. The pivot flexures were chosen and designed for infinite life, ease of assembly, and to limit degrees of freedom with the exception of the azimuth direction. In the support block and support beam, through holes and tight tolerance pin and slot holes were provided to facilitate for positioning and mounting. Also, fillets were provided for reducing stress concentrations.

The support block was designed to hold the flexural pivot and support the load of the recording head actuator. The support block also positions the recording head precisely to the deck, and it includes two machined mounting surfaces at 45 degrees to the deck (e.g., to horizontal or the upper surface of the deck or base plate), which allows symmetrical rotation of the flexures. The motor mount houses the voice coil actuator that drives the flexure pivot. The motor mount positions the motor relative to the entire deck or base plate and the flexural pivot. Particularly, the motor mount has a mounting surface that holds the motor at 90 degrees relative to the surface 603 of base plate 602, with driving forces applied via drive rod or beam 884 extending between the driver 680 and the pivot 650 and the actuator support beam 662 affixed to the two flexures 400, 500.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A recording head actuator assembly for correcting for tape mis-registration in a tape drive, comprising:
   a recording head actuator comprising a head with a plurality of read or write elements;
   a dynamic azimuth control (DAC) assembly comprising a flexural pivot and a rotation driver physically linked to the flexural pivot, wherein the recording head actuator is rigidly coupled to and supported by the flexural pivot, wherein the rotation driver operates to apply a driving force on the flexural pivot,
   wherein, in response to the driving force, the flexural pivot rotates about a hinge axis, and
   wherein, in response to the rotation of the flexural pivot, the head rotates about a rotation axis passing through the head from a first azimuth angle to a second azimuth angle.

2. The assembly of claim 1, wherein the rotation axis and the hinge axis coincide and wherein the rotation axis of the head is transverse to a direction of travel for tape past the head during read or write operations of the tape drive.

3. The assembly of claim 1, wherein the flexural pivot comprises a planar outer flexure and a planar inner flexure arranged as a cross strip pivot.

4. The assembly of claim 3, wherein the hinge axis coincides with an intersection between a first plane passing through the planar outer flexure and a second plane passing through the planar inner flexure.

5. The assembly of claim 1, wherein the rotation driver comprises a linear voice coil actuator with a plunger interconnected with at least one flexure in the flexural pivot to selectively apply the driving force.

6. The assembly of claim 5, further comprising a controller operating in response to a detection of tape mis-registration to provide control signals to the linear voice coil actuator to move the plunger to apply the driving force.

7. The assembly of claim 1, wherein the first and second azimuth angles differ by up to 7 degrees.

8. The assembly of claim 1, wherein the recording head actuator comprises a support supporting the head and at least one actuator adjusting lateral positioning of the head and wherein the DAC assembly includes an actuator support coupled with the support of the recording head actuator and with the flexural pivot, whereby rotation of the flexural pivot about the hinge axis is translated to rotation of the head about the rotation axis.

9. The assembly of claim 8, wherein the DAC assembly further includes a support block mounted to a base plate of the tape drive, wherein the flexural pivot includes flexures attached to the support block and to the actuator support, and wherein the recording head actuator is suspended above or apart and adjacent the base plate by the actuator support so as to move with the flexures.

10. An apparatus for selective rotation of a recording head in a tape drive, comprising:
    a recording head support element adapted for supporting the recording head;
    a flexural pivot;
    a support beam rigidly coupled with the flexural pivot to move with the flexural pivot, wherein the recording head support element is affixed to the support beam;

a support block adapted for mounting to a base plate of the tape drive, wherein the flexural pivot is coupled to mounting surfaces of the support block such that the flexural pivot is sandwiched between the support block and the support beam; and a rotation driver actuating the flexural pivot to rotate, whereby the flexural pivot and the interconnected recording head support element are rotated to set an azimuth angle of the recording head.

11. The apparatus of claim 10, wherein the flexural pivot comprises a planar outer flexure and a planar inner flexure arranged as a cross strip pivot.

12. The apparatus of claim 11, wherein the planar outer flexure comprises a body with an opening passing through a central portion, wherein the body of the planar outer flexure is attached at a first end to a first one of the mounting surfaces of the support block and at an opposite second end to a first mounting surface on the support beam, wherein the planar inner flexure comprises a body with a beam extending through the opening in the body of the planar outer flexure, and wherein the body of the planar inner flexure is attached at a first end to a second one of the mounting surfaces of the support block and at an opposite second end to a second mounting surface on the support beam.

13. The apparatus of claim 10, wherein the rotation driver comprises a voice coil motor linearly moving a plunger with an end interconnected with a flexure in the flexural pivot to selectively apply a force to selectively rotate the flexural pivot about a hinge axis that extends through the recording head support element.

14. A tape drive comprising:
a recording head;
an actuator laterally positioning the recording head relative to a path for magnetic tape;
a support element supporting the actuator and the recording head within the tape drive;
a mounting plate; and
a dynamic azimuth control (DAC) assembly comprising a support block attached to the mounting plate, an actuator support coupled to the support element for the actuator and the recording head, and a flexural pivot sandwiched between the support block and the actuator support,
wherein the flexural pivot rotates about a hinge axis,
wherein, in response to rotation of the flexural pivot, the recording head rotates, about a rotation axis passing through the head, from a first azimuth angle to a second azimuth angle; and
wherein the flexural pivot comprises an outer flexure and an inner flexure arranged as a cross strip pivot with a beam of the inner flexure passing through an opening between a pair of beams of the outer flexure.

15. The tape drive of claim 14, wherein the rotation axis and the hinge axis coincide.

16. The tape drive of claim 14, wherein the rotation driver comprises a linear voice coil actuator with a plunger linked with at least one flexure in the flexural pivot to selectively apply a driving force to the flexural pivot.

17. The tape drive of claim 16, further comprising a controller operating in response to a detection of tape mis-registration to provide control signals to the linear voice coil actuator to move the plunger to apply the driving force.

18. The tape drive of claim 16, wherein the first and second azimuth angles differ by up to 7 degrees.

19. The tape drive of claim 16, wherein the driving force is applied at a frequency of up to 60 Hertz and provides a change of angles from the first azimuth angle to the second azimuth angle of up to plus or minus 0.5 degrees.

* * * * *